United States Patent
DeLand (10) Patent No.: US 6,747,204 B2
(45) Date of Patent: Jun. 8, 2004

(54) ADJUSTABLE POWER AND TELECOMMUNICATIONS OUTLET APPARATUS AND METHOD FOR FURNITURE AND WALL STRUCTURES

(75) Inventor: Martin L. DeLand, Corona, CA (US)

(73) Assignee: L & P Property Management Company, South Gate, CA (US)

(*) Notice: Subject to any disclaimer, the term of this patent is extended or adjusted under 35 U.S.C. 154(b) by 0 days.

(21) Appl. No.: 10/214,820

(22) Filed: Aug. 8, 2002

(65) Prior Publication Data

US 2003/0034167 A1 Feb. 20, 2003

Related U.S. Application Data (60) Provisional application No. 60/373,522, filed on Apr. 18, 2002, and provisional application No. 60/313,435, filed on Aug. 17, 2001.

(51) Int. Cl.$^7$ ................................................ H05K 5/00
(52) U.S. Cl. .................. 174/50; 174/48; 174/49; 174/52.1; 174/51; 174/68.1; 174/97; 174/99 R; 174/101
(58) Field of Search ............................ 174/50, 48, 49, 174/52.1, 51, 68.1, 97, 99 R, 101; 220/335; 108/50; 312/223.6

(56) References Cited

U.S. PATENT DOCUMENTS

| | | | |
|---|---|---|---|
| 4,017,137 A | * 4/1977 | Parks | 439/135 |
| 4,406,379 A | * 9/1983 | Anderson et al. | 220/829 |
| 4,489,995 A | * 12/1984 | Barr | 312/236 |
| 4,535,703 A | * 8/1985 | Henriott et al. | 108/50.02 |
| 4,731,029 A | 3/1988 | Lerner et al. | |
| 4,762,072 A | * 8/1988 | Boundy et al. | 108/50.02 |
| 5,239,129 A | * 8/1993 | Ehrenfels | 174/51 |
| 5,328,260 A | 7/1994 | Beirise | |
| 5,348,274 A | * 9/1994 | Breen | 269/3 |
| 5,831,211 A | 11/1998 | Gartung et al. | |
| D404,010 S | 1/1999 | Viklund et al. | |
| 5,861,576 A | * 1/1999 | Langston et al. | 174/48 |
| 5,934,201 A | 8/1999 | Diffrient | |
| 6,029,586 A | * 2/2000 | Schiavello | 108/147 |
| 6,133,845 A | 10/2000 | Toms et al. | |
| 6,254,206 B1 | 7/2001 | Petrick et al. | |

* cited by examiner

Primary Examiner—Anthony Dinkins
Assistant Examiner—Anton Harris
(74) Attorney, Agent, or Firm—Michael Best & Friedrich LLP (57) ABSTRACT

An apparatus for positioning power or telecommunications outlets in furniture and wall systems. The apparatus cooperates with a wall, partition or furniture system to repositionably support a cable suitable for transmitting telecommunications data and/or electrical power. The apparatus includes an outlet box and a conduit or channel for receiving the cable. Means for removably attaching the apparatus to the system are provided so that the apparatus can be removably attached to the system in a plurality of positions. The system may include a base and a support frame forming a plurality of mounting positions. A removable cover may fit over at least a portion of an open side of the conduit or channel for restricting access to the interior of the channel. A method for repositionably supporting a cable in a modular construction system forming a plurality of mounting locations is also disclosed.

41 Claims, 6 Drawing Sheets

ADJUSTABLE POWER AND TELECOMMUNICATIONS OUTLET APPARATUS AND METHOD FOR FURNITURE AND WALL STRUCTURES

This application claims the benefit and priority of U.S. provisional patent application serial No. 60/313,435 filed Aug. 17, 2001 and U.S. provisional patent application serial No. 60/373,522 filed Apr. 18, 2002.

FIELD OF THE INVENTION

The present invention relates to power and telecommunications outlets, and more particularly to power and telecommunications outlets adapted for use in walls, partitions, and furniture of modular construction.

BACKGROUND OF THE INVENTION

Numerous walls, partitions and furniture items are provided with power and telecommunications outlets. In the case of wall systems, the demand for power and telecommunications outlets that can be quickly and easily installed is significant (regardless of whether the walls are interior or exterior or are load bearing or non-load bearing). In the case of partitions and furniture, similar demand exists in order to reduce manufacturing and assembly time and to reduce the cost of the partitions and furniture.

Nevertheless, few existing outlet designs offer the versatility desired by consumers. For example, a large amount of home and office furniture, school and lab equipment, and partition and wall systems are more modular and portable in design. With increasing modularity, the routing and installation of power and telecommunications lines within such furniture, equipment, and partition and wall systems represents an ever-increasing burden for assemblers, installers, and users.

Typically, power and telecommunications outlets for shelving and display assemblies, home and office furniture, school and lab equipment, and partition and wall systems (hereinafter collectively referred to as "furniture and wall systems") are not readily positionable in different locations to accommodate different arrangements of the furniture and walls. Most existing power and telecommunications outlets are rigidly attached to particular locations on the furniture and walls, and cannot be moved from their attached positions.

In many furniture and wall systems, power and telecommunications outlets are permanently mounted to the furniture or wall or to a frame thereof. In other furniture and wall systems, each power or telecommunications outlet is removably attached to one location or can be attached (removably or otherwise) to only a small number of locations on the furniture or wall. Depending upon the setup and arrangement of the furniture and/or walls, this lack of versatility can present a problem for users who desire to plug devices into the outlets. Unless the devices are near the power and telecommunications outlets, one or more wires, extension cords, cables, phone cords, or other power and telecommunications lines (referred to herein collectively as "power and telecommunications extension lines") are needed to connect the devices to the outlets. In some cases, the distances spanned by the power and telecommunications extension lines are fairly large, causing potential tripping or snagging hazards and resulting in an unsightly work or living area.

Some furniture and wall systems having power and telecommunications outlets do permit limited adjustability of the outlets. However, this adjustability is typically poorly-suited for many arrangements of the walls, furniture, and for the components and accessories intended for use with the walls and furniture systems. Despite the fact that the outlets can be placed in different positions, the resulting outlet locations are often still awkward relative to the components, accessories, and devices used with the furniture and wall systems.

For example, a modular shelving unit typically includes a plurality of shelves that can be positioned in many different arrangements. The modular shelving unit can support devices that need to be plugged into the power and telecommunications outlets. However, the high degree of adjustability permitted by many modular shelving units is not matched by the relatively small number of power and telecommunications outlet positions. Therefore, power and telecommunications extension lines are needed or devices supported by the shelving units must be re-positioned (thereby limiting the range of uses for the shelving systems).

Furniture and wall system designs are typically limited by a number of other considerations, including without limitation the overall cost of the systems, space constraints, and ease of manufacture and assembly. A furniture or wall system with more versatile power and telecommunications outlets preferably would not be significantly more expensive to manufacture and assemble, would not limit modularity and portability of the system (if these features are desired), and would not consume significant space.

There is also a need to expedite full inspection of power routings. These full inspections are required under some municipal building codes. A modular power outlet, which can be quickly and easily disassembled and reassembled, is desirable so that a full power routing inspection is practical at any time. The inspector may visit the building site.

In light of the problems and limitations described above, a need exists for power and telecommunications outlets in furniture and wall systems that can be placed in a wide range of positions for increased accessibility and connectivity, are readily adaptable to different furniture or wall arrangements without sacrificing system modularity and portability (if such features are desired), do not significantly add to system size or complexity, and are relatively inexpensive to manufacture and assemble.

SUMMARY OF THE INVENTION

The present invention provides an apparatus and a method for positioning power or telecommunications outlets in furniture and wall systems. The apparatus cooperates with a modular construction system, for example, to repositionably support a cable suitable for transmitting telecommunications data or electrical power. The apparatus includes a channel that is sized for receiving the cable. An outlet box is mounted on the channel. Means for removably attaching the apparatus to the modular construction system are provided.

In a preferred embodiment of the present invention, the apparatus can be removably attached to the modular construction system in a plurality of positions, one of the positions being laterally displaced and/or inverted with respect to another of the positions. In another preferred embodiment, the modular construction system includes a base and a support frame that forms a plurality of mounting positions and is connected to the base.

In still another preferred embodiment, the invention is a modular conduit for use with a modular construction system forming mounting locations to repositionably support a cable suitable for transmitting at least one of telecommunications data and electrical power. The modular conduit includes an elongated channel that has two ends and a substantially open side for providing access to the interior of the channel, and is sized for receiving a cable suitable for transmitting at least one of telecommunication data and electrical power. A removable cover fits over at least a portion of the open side for restricting access to the interior of the channel. An outlet box is mounted on the channel. The modular conduit is removably attached to the mounting locations so that the modular conduit and the modular construction system cooperatively and repositionably support the cable.

In yet another preferred embodiment, the invention is a work station including a repositionable power outlet and/or data connection port. The work station includes a base and a support frame forming a plurality of mounting positions. The support frame is connected to the base. The work station also includes a modular conduit that is repositionably attachable to the support frame at the mounting positions. The modular conduit includes a conduit or channel, an outlet and a cable suitable for transmitting at least one of telecommunications data and electrical power.

The invention is also a method for repositionably supporting a cable in a modular construction system forming a plurality of mounting locations. The method includes providing a modular construction system forming a plurality of mounting locations, and removably attaching an elongated channel to the system at one of the mounting locations. The channel has two ends and a substantially open side for providing access to the interior of the channel. An outlet box is mounted on the channel. The interior of the outlet box may communicate with the interior of the channel. A cable suitable for transmitting at least one of telecommunication data and electrical power is positioned within the interior of the channel. An outlet box is electrically connected to the cable. The outlet box is suitable for transmitting at least one of telecommunication data and electrical power.

Although the present invention can be applied to any shelving and display assembly, home and office furniture, school and lab equipment, and partition and wall system as mentioned above, the following description and accompanying drawings are with reference to shelving assemblies by way of example only. Also, the present invention can be employed in any wall system, but can be used with particular advantage in interior wall systems and in wall systems that are modular in nature.

The shelving assembly described below and illustrated in the figures is modular, and has shelves that can be adjusted to multiple positions. The present invention can be employed with other types of shelving units as desired. Also, the following description and accompanying drawings are with reference to power apparatus according to the present invention, and are presented by way of example only. The present invention finds application with respect to any type of power and telecommunications outlet.

Regardless of the manner in which the apparatus can be employed to position outlets in desired locations (i.e., whether mountable on the support frame in different manners and/or whether the outlet can be releasably secured in different locations along the channel), the apparatus in some embodiments of the present invention can be mounted in multiple locations on the support frame. By way of example, a vertically-oriented apparatus can be releasably secured in multiple horizontal positions on the support frame, or a horizontally-oriented apparatus can be releasably secured in multiple vertical positions on the support frame. In some embodiments, the outlet of the apparatus is not adjustable along the channel and the apparatus can be mounted in only one orientation on the support frame. However, even in such embodiments, the ability to mount the apparatus to different positions (e.g., vertical or horizontal) on the support frame provides significant advantages over existing apparatus designs.

Other features and advantages of the invention will become apparent to those skilled in the art upon review of the following detailed description, claims, and drawings.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF PREFERRED EMBODIMENTS OF THE INVENTION

The present invention is described in terms of its application to a modular shelving system having selectively positionable shelves. However, as described above, the present invention is applicable to any shelving and display assemblies, home and office furniture, school and lab equipment, and partition and interior wall systems provided with power or telecommunications outlets. The modular shelving application is presented herein by way of example only.

Figure 1:
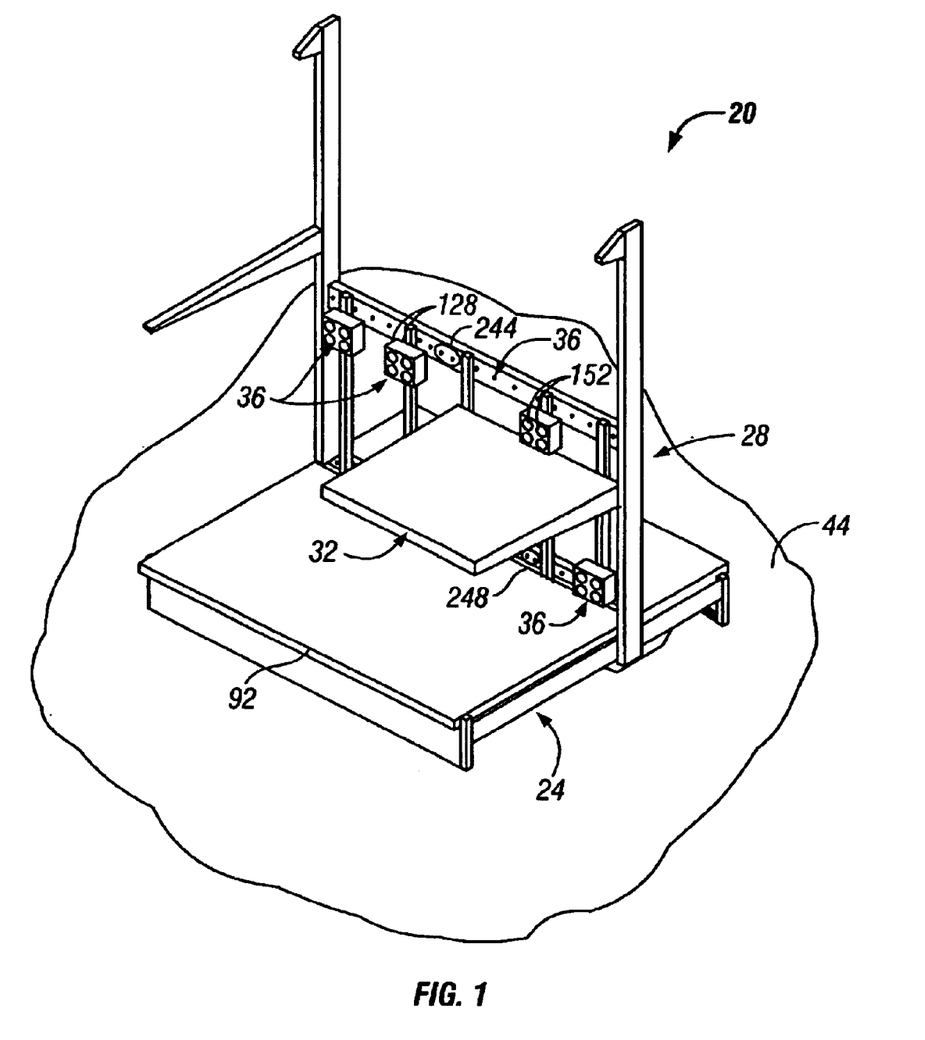
FIG. 1 is a perspective view of a partially-assembled modular shelving unit and apparatus or modular conduit according to a preferred embodiment of the present invention.

FIG. 1 illustrates a modular shelving unit 20 according to a preferred embodiment of the present invention. The shelving unit 20 preferably includes a horizontal base 24, a vertical support frame 28, a plurality of shelves 32 (only one being shown in FIG. 1) and at least one apparatus or modular conduit 36 for repositionably supporting a cable.

Figure 2:
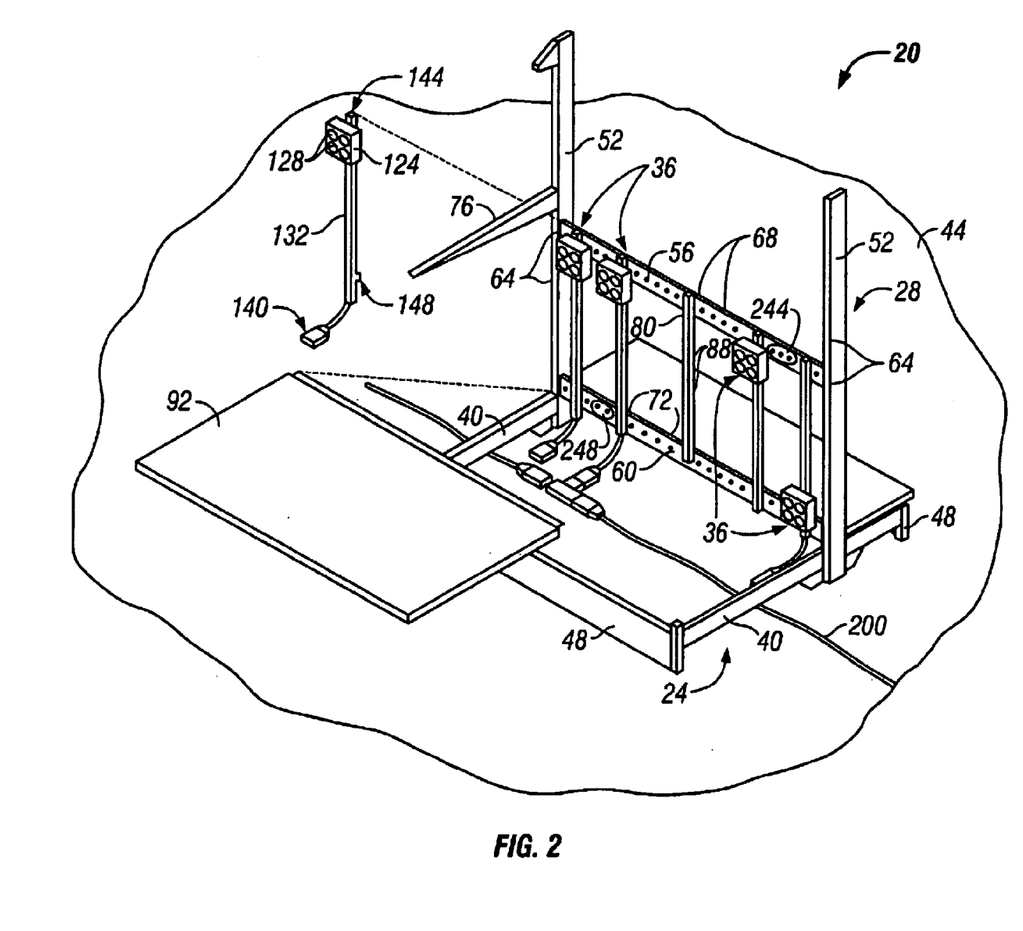
FIG. 2 is an exploded perspective view of the modular shelving unit and apparatus illustrated in FIG. 1.

Referring also to FIG. 2, the base 24 preferably includes side channels 40 that extend horizontally with respect to a ground surface 44. Kickboards 48 can be mounted to the ends of the side channels 40 if desired.

The support frame 28 is preferably mounted to the side channels 40 of the base 24 and preferably extends generally vertically upward from the ground surface 44. Although the support frame 28 can take a number of different forms, the support frame 28 in the illustrated preferred embodiment includes a pair of uprights 52, an upper stretcher 56, and a lower stretcher 60. The uprights 52 preferably include a plurality of mounting apertures 64 for selectively mounting the shelves 32 to the support frame 28 (described in more detail below). The upper and lower stretchers 56, 60 preferably extend generally parallel to the ground surface 44, but can connect the uprights 52 at any other orientation desired. The upper and lower stretchers 56, 60 extend between and are mounted to the uprights 52. The upper and lower stretchers 56, 60 preferably include a plurality of upper apertures 68 and a plurality of lower apertures 72, respectively, for selectively mounting the apparatus 36 to the support frame 28 (described in greater detail below).

The support frame 28 also preferably includes a plurality of support arms 76 (one shown) extending from the support frame 28 preferably in a direction parallel to the base 24. The support arms 76 are preferably selectively mountable in a plurality of positions on the support frame 28. The support arms 76 provide support to the selectively positionable shelves 32 by being positioned underneath the shelves 32, with the shelves 32 resting on the support arms 76.

The support frame 28 can further include one or more secondary uprights 80 connecting the upper and lower stretchers 56, 60. In some preferred embodiments, the secondary uprights 80 can be connected to the upper and lower stretchers 56, 60 in two or more locations in a number of different manners such as those described below with reference to the channels 132 of the apparatus 36.

In the illustrated preferred embodiment, the secondary upright 80 has one end selectively mounted to the upper stretcher 56 and another end selectively mounted to the lower stretcher 60. The secondary upright 80 is preferably mounted to the upper and lower stretchers 56, 60 by brackets (not shown) similar to brackets used for mounting the apparatus or modular conduit 36 to the upper and lower stretchers 56, 60 (discussed in greater detail below). Although the secondary upright 80 can be connected to the upper and lower stretchers 56, 60 at any angle, the secondary upright 80 is preferably mounted generally perpendicular to the ground surface 44 and more preferably can be selectively positioned along the upper and lower stretchers 56, 60 in a plurality of positions such that the secondary upright 80 maintains a generally perpendicular alignment with respect to the ground surface 44. In some embodiments, the secondary upright 80 is adapted to support one or more shelves 32 (see FIG. 1) via one or more support arms 76. Depending upon the spacing of the uprights and the dimensions of the shelves 32, each shelf 32 can be supported by any combination of uprights 52 and secondary uprights 80.

The shelves 32 in the modular shelving unit 20 can be in a plurality of different sizes and can be selectively mounted to the support frame 28 in a plurality of positions. In some embodiments for example, large shelves 92 can be located in a range of vertical positions extending from the tops of the uprights 52 to the base 24, while smaller shelves 32 can be located in a range of positions along the secondary uprights 80. Other components and elements or various combinations thereof can similarly be mounted at various different locations along the uprights 52 and secondary uprights 80 (where secondary uprights 80 are employed). Such components and elements include, for example, countertops, cases, hanger racks, baskets, walls, partitions, and the like. Hereinafter, all such components and elements are referred to collectively as "shelves."

Apparatus 36 can be removably attached to uprights 52, 80 in essentially the same manner as the stretchers 56, 60. Additionally, apparatus 36 can be removably attached to stretchers 56, 60 in essentially the same manner as uprights 52, 80. In either case, apparatus 36 lies in approximately the same plane as uprights 52, 80 or stretchers 56, 60. Shelves, such as shelf 32, can be mounted on support frame 28 without being obstructed by apparatus 36. The shelves fit over apparatus 36 without interference, because apparatus 36 is mounted so that it lies behind the shelves. Apparatus 36 can be repositioned to many locations because it does not interfere with the placement of the shelves.

The connections between the uprights 52 and the stretchers 56, 60, between the stretchers 56, 60 and the secondary uprights 80, and between the shelves or other components and the uprights 52 or secondary uprights 80 can be made in a number of different manners well-known to those skilled in the art. Any or all of these connections can be permanent or releasable as desired. Also, any or all of these connections can be adjustable or non-adjustable.

With reference to the connections between the stretchers 56, 60 and the uprights 52, these connections are preferably in the form of headed posts or pins (not shown) extending from the ends of the stretchers 56, 60 for releasable engagement with brackets (also not shown) on the uprights 52. Other types of connections include without limitation pins or posts on the stretchers 56, 60 releasably engagable within apertures in the uprights 52, hooks on the stretchers 56, 60 or uprights 52 releasably engagable with hooks, pins, brackets, or apertures on the uprights 52 or stretchers 56, 60, respectively, inter-engaging clips on the uprights 52 and stretchers 56, 60, and the like. In other embodiments, the ends of the stretchers 56, 60 can be received within apertures in the uprights 52 and can be secured therein by one or more conventional fasteners (e.g., pins, posts, bolts, screws, and the like) passed through aligned or substantially aligned apertures in the stretchers 56, 60 and uprights 52. Alternatively, the stretchers 56, 60 can be connected in other manners to the uprights by one or more conventional releasable fasteners, such as clamps, bolts, or screws. One having ordinary skill in the art will appreciate that still other manners of releasably connecting the stretchers 56, 60 to the uprights 52 are possible, each one of which falls within the spirit and scope of the present invention.

In those embodiments in which the stretchers 56, 60 are adjustably connected to the uprights 52, the uprights 52 preferably have multiple fasteners or fastening locations for permitting such adjustment. For example, fasteners on the stretchers 56, 60 can be received within, inter-engage with, or otherwise connect to selected apertures or fasteners located along at least part of the length of the uprights 52. Therefore, the stretchers 56, 60 can be secured to the uprights 52 in multiple positions along at least part of the length of the uprights 52, and more preferably can be secured to the uprights 52 in a range of positions along the uprights 52. Any number of stretchers 56, 60 can be connected between uprights 52 as desired.

As described above, shelves 32, 92 and/or other components and assemblies can be connected to the uprights 52 and secondary uprights 80 (if employed). In the illustrated preferred embodiment, shelves 32, 92 are connected to the uprights 52 and secondary uprights 80 by support arms 76. These support arms 76 preferably have one or more hooks (not shown) that are received within apertures 64, 88 in the uprights 52 and secondary upright 80. Although not required, the uprights 52 and secondary upright 80 can be provided with multiple apertures at different positions along their lengths, enabling the connection of the support arms 76 or other components at different locations on the uprights 52 and secondary upright 80. Most preferably, the uprights 52 and secondary upright 80 are provided with a series of such apertures 64, 88 along their lengths. In this manner, the support arms 76 can be connected at multiple locations (and more preferably in a range of locations) to the uprights 52 and secondary upright 80. In alternative embodiments, the shelves 32, 92 have hooks that can be received within the apertures 64, 88, thereby eliminating the need for separate support arms 76.

In one embodiment employing hook-and-aperture type connections as just described, the hooks have a first portion that extends rearwardly away from the rear of the shelves 32. Each of the hooks also have a second portion that is curved downward toward the ground surface 44. Once the hooks are inserted into the apertures 64 of the uprights 52 and the apertures 88 of the secondary upright 80, the hooks preferably hold the shelves 32 in positions parallel or substantially parallel to the ground surface 44.

In another embodiment, an alternate hook configuration can be employed to connect the shelves 32, 92 to the uprights 52, 80. In this alternative configuration, the hooks (not shown) have a first portion extending rearwardly away from the rear of the shelves 32. At least one of the hooks also has a second portion that is curved upward away from the ground surface 44. Once the upwardly-extending hooks are inserted into the apertures 64 of the uprights 52 and the apertures 88 of the secondary uprights 80, these hooks and one or more downwardly-extending hooks hold the shelves 32 in positions parallel to or substantially parallel to the ground surface 44.

Hook and aperture connections between the support arms 76 or shelves 32, 92 and the uprights 52, 80 are preferred. However, any other releasable connection can instead be employed, including any of the other types of connection described above with reference to the connections between the stretchers 56, 60 and the uprights 52.

For example, the shelves 32 can be selectively mountable to the support frame 28 by conventional fasteners, such as screws, bolts, and pins. Such fasteners can preferably be removed such that the shelves 32 can be selectively positioned and remounted in one or more other desired locations.

The embodiments described above represent only a few of the possibilities for mounting the shelves 32 to the support frame 28 (either releasably or permanently, and either adjustably or non-adjustably). The prior embodiments are not intended to be limiting, but only to provide examples of mounting arrangements. Any other conventional manner for fastening shelves 32 to the support frame 28 can instead be used, and still falls within the spirit and scope of the present invention.

Figure 3:
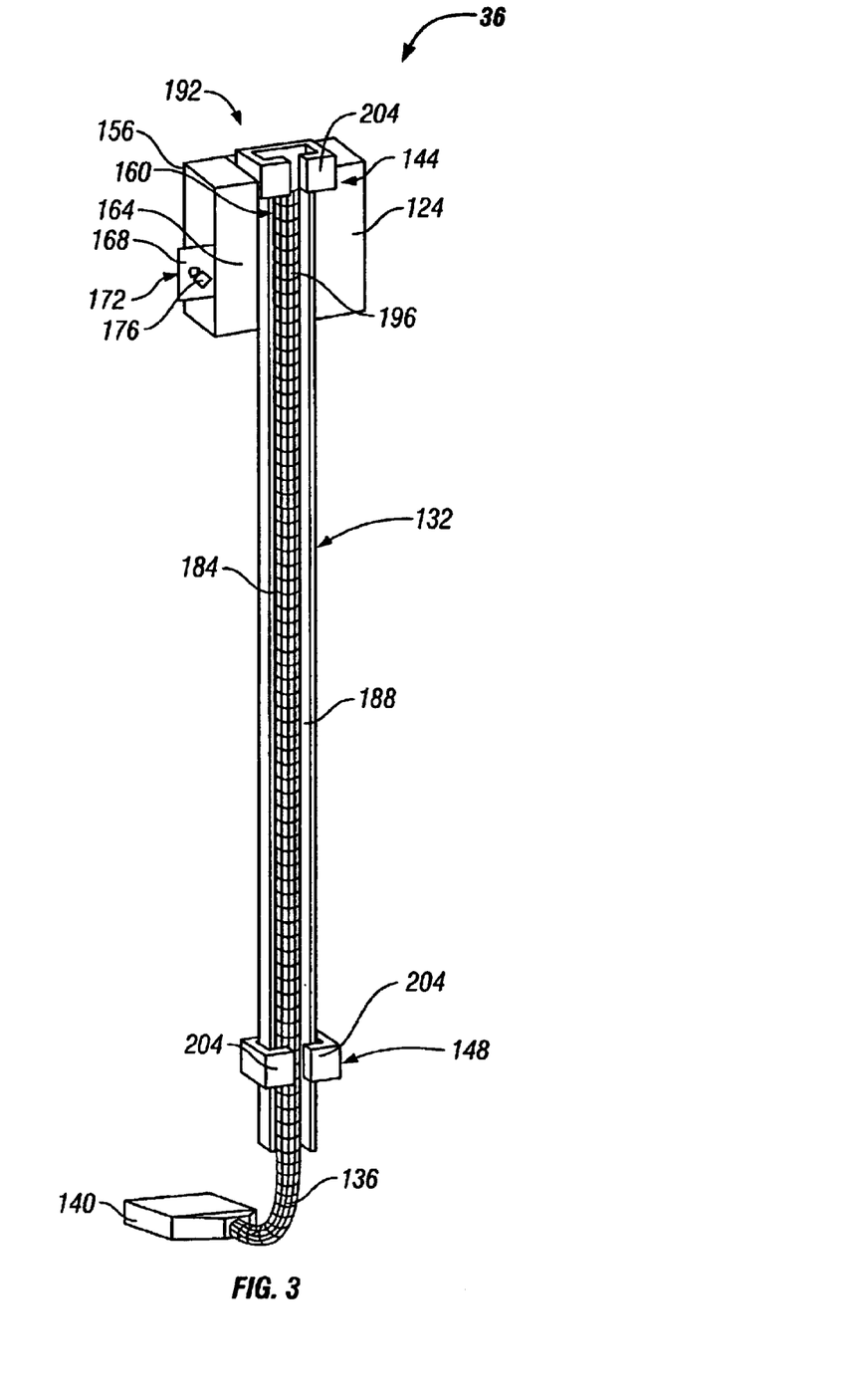
FIG. 3 is a rear perspective view of the apparatus illustrated in FIGS. 1 and 2.
Figure 4:
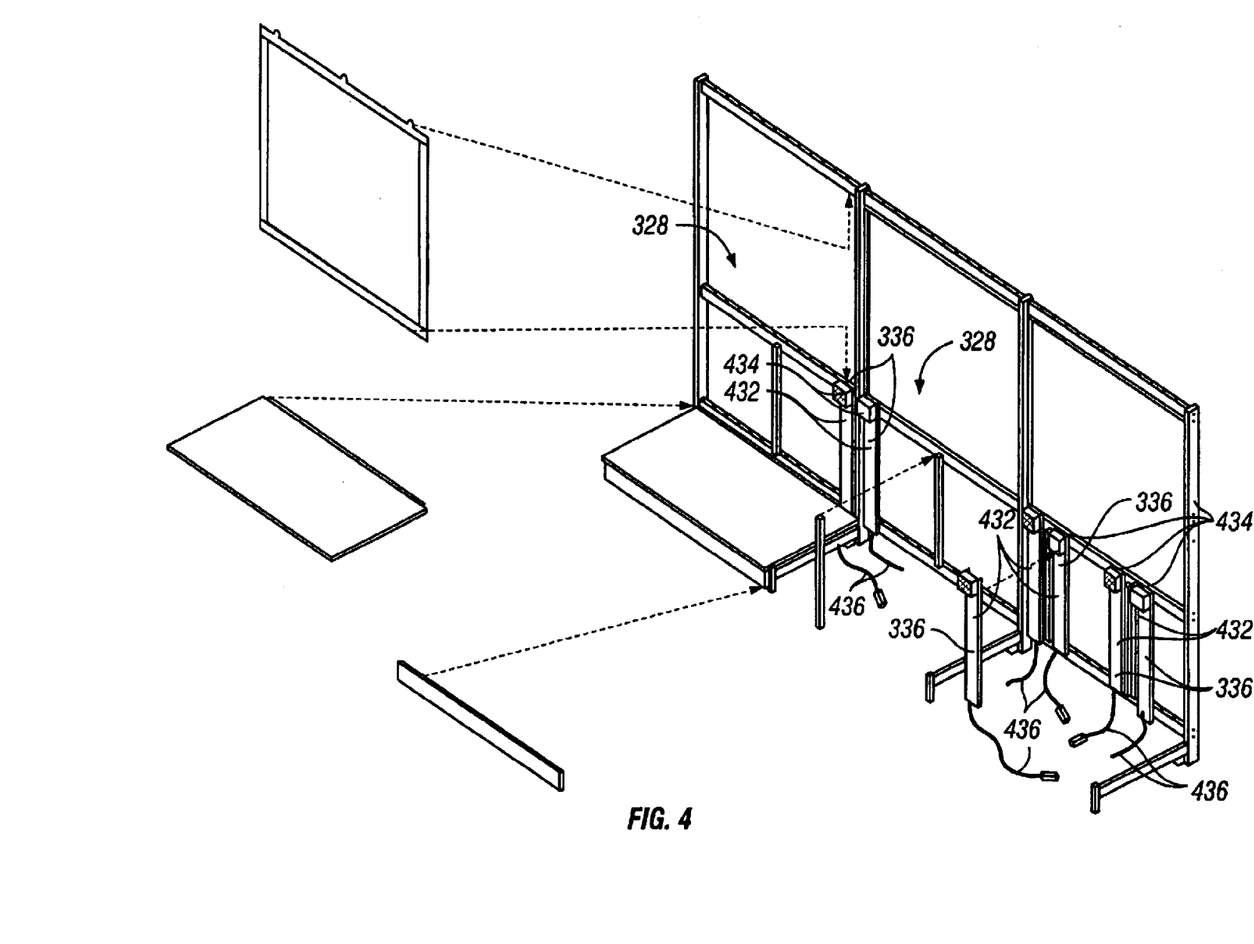
FIG. 4 is a perspective view of a partially-assembled work station and apparatus or modular conduit according to a preferred embodiment of the present invention.

With continued reference to FIGS. 1–3, the apparatus 36 of the present invention preferably includes an outlet housing or box 124, one or more electrical 30 outlets 128 (and more preferably a plurality of electrical outlets 128), a conduit or channel 132, and one or more electrical lines 136. The electrical lines 136 can take a number of different forms, such as insulated wire, flex conduit as shown in the figures, cable, and the like. In some highly preferred embodiments, the apparatus 36 further includes one or more brackets (such as an upper bracket 144 and a lower bracket 148) or other fasteners for connecting the apparatus 36 to the support frame 28. These and other preferred embodiments can include an electrical fastener connected to the electrical lines 136.

The outlet housing or box 124 preferably includes a plurality of apertures 152 located in a front surface 156 of the outlet housing 124. Preferably, these apertures 152 are shaped and sized to receive the electrical outlets 128. The electrical outlets 128 are preferably conventional electrical outlets known to those skilled in the art. In the illustrated preferred embodiment, the outlet housing 124 has four apertures 152. However, any number of apertures 152 can be included in the outlet housing 124 to correspond to any number of desired electrical outlets 128 for the apparatus 36. It should also be noted that the apertures 152 could also or instead be located in any other portion in the outlet housing 124.

The outlet housing 124 preferably functions as a housing for containing the connections between the electrical outlet(s) 128 and the electrical lines 136. The outlet housing 124 can be any shape and size desired, and can enclose any number of electrical outlets 128 desired (subject to electrical code requirements).

The outlet housing 124 preferably includes a wiring aperture 160 located in a back surface 164 of the outlet housing 124 through which the electrical lines 136 run to the electrical outlets 128. Alternatively, the wiring aperture 160 can be located in any other surface of the outlet housing 124. As described above, the electrical outlets 128 are preferably mounted within and supported by the outlet housing 124. The electrical outlets 128 can be of any type desired. Alternatively, the outlets 128 can be telecommunication outlets for connection to co-axial cable, telephone lines, and the like.

In the illustrated preferred embodiment of the present invention, the outlet housing 124 includes a plate 168 extending laterally away from the outlet housing 124. The plate 168 preferably includes an aperture 172 through which a thumb screw 176 is passed. The thumb screw 176 can be tightened to secure the apparatus 36 to a desired position on the support frame 28 as will be described in greater detail below.

The outlet housing 124 is connected to the conduit or channel 132 in any conventional manner. In the illustrated preferred embodiment for example, the outlet housing 124 is permanently connected to the channel 132 by one or more welds. Other manners of permanently and releasably connecting the outlet housing 124 to the channel 132 include brazing, clamping, fastening by one or more conventional fasteners such as rivets, bolts, screws, and the like.

The conduit or channel 132 can take any cross-sectional shape desired, and in the illustrated preferred embodiment has a U-shaped cross-section with an outside surface 184 and an inside surface 188 defining an internal cavity 192. In some preferred embodiments, the back surface 164 of the outlet housing 124 is supported on the outside surface 184 of the channel 132, while the electrical lines 136 extend through the cavity 192 and along the inside surface 188 of the channel 132. One end of the electrical lines 136 can be bent 90° prior to passing into the wiring aperture 160 of the outlet housing 124. Alternatively, the electrical lines 136 can pass into the outlet housing 124 via a 90° angle wiring conduit 196 connected to the outlet housing 124 and/or to the channel 132 in any conventional manner.

In alternative embodiments, the outlet housing 124 is connected to the channel 132 so that the electrical lines 136 approach a side of the outlet housing 124, thereby entering a wiring aperture 160 in the side of the outlet housing 124. Depending at least in part upon the manner of connection of the outlet housing 124 to the channel 132, the electrical lines 136 can therefore enter directly into the outlet housing 124 without being bent, or can bend at any angle in order to enter through a side of the outlet housing 124.

The other ends of the electrical lines 136 are preferably connected to the electrical connector 140. The electrical connector 140 preferably directly or indirectly connects the apparatus 36 to a power source 200 supplying electrical power to the apparatus 36. Any conventional electrical connector can be used to connect the apparatus 36 to the outside power source 200. If desired, the electric lines 136 can be retained within the cavity 192 of the channel 132 by one or more flanges, bendable tabs, clips, bands, or in any other conventional manner. Preferably, at least one of the upper and lower brackets 144, 148 (described below) help to perform this function by at least partially closing the cavity 192.

Referring again to FIGS. 1–3, upper and lower brackets 144, 148 are preferably connected to the channel 132 in any conventional manner, such as by being stamped, bent, or otherwise formed therefrom, by being welded or brazed thereto, by being fastened thereto by one or more conventional fasteners such as rivets, screws, bolts, and the like. In some preferred embodiments, the brackets 144, 148 at least partially encircle the channel 132 and assist in retaining the electrical lines 136 within the cavity 192. In one highly preferred embodiment, the upper and lower brackets 144, 148 each include one or more clips 204 protruding away from the channel 132 and curving downward toward the ground surface 44. The clips 204 are used for selectively mounting the apparatus 36 to the support frame 28 as will be described in greater detail below.

In some embodiments of the present invention, the upper and lower brackets 144, 148 are mounted to the channel 132 by snapping the brackets 144, 148 thereto. In such embodiments, the channel 132 can have a number of recesses in spaced relation along the length of the channel 132. These recesses can be defined by a plurality of lips along the channel 132, by a series of apertures along the channel 132, and the like. The brackets 144, 148 can have resilient arms or fingers that can be snapped into desired positions on the channel by engagement within any of the recesses on the channel 132. To assist in this engagement, the resilient arms or fingers can have one or more protrusions that are received within recesses on the channel 132.

Each bracket 144, 148 can have two or more such resilient arms or fingers. The resilient arms or fingers can extend from the clips 204 of the brackets 144, 148 to positions flanking the channel 132. For example, the resilient arms or fingers can form a U-shape, a generally circular or arc shape, or any other shape providing a space for the channel 132. In some embodiments of the present invention employing such brackets, the protrusions on the resilient arms or fingers can extend into the recesses between the lips on the channel 132 as the brackets 144, 148 are mounted to the channel 132. The resilient arms or fingers can be spaced from one another a distance that is slightly narrower than the channel 132 so that the resilient arms or fingers must expand in order to receive the channel 132, after which time the resilient arms or fingers contract to enter the channel recesses.

As mentioned above, the clips 204 are preferably employed for selectively mounting the apparatus 36 to the support frame 28. Specifically, the clips 204 on the upper and lower brackets 144, 148 can be selectively inserted into the apertures 68, 72 of the upper and lower stretchers 56, 60, respectively. The clips 204 can extend in any direction suitable for engagement with the upper and lower stretchers 56, 60 or other structure of the support frame 28. For example, in the embodiment of the present invention illustrated in FIGS. 1–3, the clips 204 extend in a downward direction for insertion into the upwardly-facing apertures 68, 72 of the upper and lower stretchers 56, 60. As another example, the clips 504 in the embodiment of the present invention illustrated in FIGS. 4–7 (described below) extend in opposite directions (away from one another) for insertion into facing apertures 68, 72 of the upper and lower stretchers 56, 60. The clips 204, 504 can extend in any other manner suitable for insertion into apertures 68, 72 oriented in any other manner in the support frame 28. Similarly, the elements and structure described herein that can be employed as alternatives to the clips 204, 504 and the brackets 144, 148 can also be oriented in any manner suitable for connection of the apparatus 36 to the upper and lower stretchers 56, 60 or to other elements of the support frame 28.

The selectively insertable clips 204 allow the apparatus 36 to be mounted in a number (and most preferably in a range) of lateral positions along the stretchers 56, 60. Preferably, the apparatus 36 are substantially upright in each such position, although other apparatus orientations are possible. In the illustrated preferred embodiment, upper and lower brackets 144, 148 are shown on the channel 132. However, the channel 132 can be provided with any number of brackets for connection to any number of stretchers in order to perform the same functions just described.

Brackets 144, 148 as shown in the accompanying figures are preferred for connecting the channel 132 to one or more stretchers 56, 60. In those embodiments of the present invention permitting lateral adjustability of the channel 132 and outlets 128, the brackets 144, 148 are also preferred for enabling this adjustability. However, one having ordinary skill in the art will appreciate that a number of other elements can also or instead be employed for performing either or both functions. For example, one or more hooks can be connected to the channels 132 for selective engagement with apertures or hooks on the stretchers 56, 60. As another example, one or more pins, posts, fingers, dowels, hooks, or other elongated elements can extend from the channel 132 into apertures in the stretchers 56, 60. Such elements need not necessarily engage with apertures (or other fasteners) on the top surfaces of the stretchers 56, 60 as shown in the figures. Instead, these elements can extend into engagement with apertures or other elements on the sides of the stretchers 56, 60. In yet another embodiment, headed posts extending rearwardly from the channel 132 can be received within brackets connected to the stretchers 56, 60. Still other manners of connecting the channel 132 to the stretchers (preferably in a number of different positions thereon) are possible, some of which are described above with reference to the manners in which the shelves 32, 92, support arms 76, and stretchers 56, 60 can be connected to the uprights 52, 80. Each of these manners of connection falls within the spirit and scope of the present invention. As also described above, the ability to attach the channels 132 to a number of different lateral locations on the support frame 28 provides the user with significantly increased versatility in positioning the outlets 128.

In a number of embodiments of the present invention, the apparatus 36 are not rigidly secured to the support frame 28 after being positioned thereon. By way of example only, the apparatus 36 of the illustrated preferred embodiment are retained in place on the support frame 28 by clips 204 of the brackets 144, 148 received within apertures 68, 72 of the stretchers 56, 60. Although not required to practice the present invention, in these embodiments one or more fasteners are preferably tightened after placing the apparatus 36 in their desired positions in order to secure the apparatus 36 to the support frame 28. In the illustrated preferred embodiment, the fastener is the thumbscrew 176. The thumbscrew 176 can be tightened against a surface of a stretcher 56, 60, but more preferably is received within an aperture in the stretcher 56, 60. More preferably, a series of such apertures 244, 248 are provided in each stretcher 56, 60, each of which are positioned to receive the thumbscrews 176 of the apparatus 36 when the apparatus are positioned as desired on the support frame 28.

Referring to FIGS. 1–3, in one embodiment of the present invention, the upper and lower stretchers 56, 60 of the support frame 28 preferably include a plurality of laterally aligned upper threaded apertures 244 and a plurality of laterally aligned lower threaded apertures 248, respectively, into which thumbscrews 176 can be threaded. As mentioned above, the threaded apertures 244, 248 are preferably positioned such that they are aligned or are substantially aligned with thumbscrews 176 of the apparatus 36 when the apparatus 36 are selectively mounted at any of the plurality of lateral positions along the upper and lower stretchers 56, 60. As described in greater detail below, the outlet housing 124 in the illustrated preferred embodiment can be selectively mounted in an upper position in which the thumbscrew 176 is threaded into one of the upper threaded apertures 244 along the upper stretcher 56, and a lower position in which the thumbscrew 176 is threaded into one of the lower threaded apertures 248 along the lower stretcher 60.

It will be appreciated that a number of different types of fasteners can be employed to secure the apparatus 36 with respect to the support frame 28 after they have been positioned thereon. Such alternative fasteners include bolts, setscrews, and other threaded fasteners, pins, rods, and the like. Furthermore, each apparatus 36 can be secured with any number of fasteners. In some embodiments of the present invention, such fasteners are not required because the element or elements used to connect the apparatus 36 to the stretchers 56, 60 (described above) also secure the apparatus 36 with respect to the stretchers 56, 60.

In the illustrated preferred embodiment of the present invention, the apparatus 36 are fastened with thumbscrews 176 passed through a plate 168 extending from the outlet housing 124. One having ordinary skill in the art will appreciate that the thumbscrews 176 (or other fasteners employed as described above) need not necessarily pass through a plate 168 as described, but can instead pass through any part of the outlet housing 124 or channel 132, through any other extension, flange, or boss on the outlet housing 124 or channel 132, and the like.

Significant advantages are obtained by employing apparatus 36 that can be placed in different lateral positions as described above, enabling an assembler to attach outlets 128 in different lateral positions with respect to the support frame 28. In some preferred embodiments of the present invention, the outlets 128 can also or instead be attached in different vertical positions with respect to the support frame 28 as will now be described.

With reference again to FIGS. 1–3, the apparatus 36 can be attached to the support frame as described above in a right-side up or upside down manner. In those embodiments in which brackets 144, 148 are employed to mount the apparatus 36 to the support frame 28, multiple sets of brackets 144, 148 having upwardly and downwardly-extending clips can be used. Therefore, an apparatus 36 can be turned upside down (with the electrical lines 136 passed through an opposite end of the channel 132) and can be attached to the support frame 28 as described above. This feature enables the user to quickly position the apparatus 36 on the support frame 28 at two different heights. When used in conjunction with the lateral adjustability of the apparatus as described above, greater versatility is possible.

For even greater adjustability of the outlets 128 on the support frame 28, some preferred embodiments of the present invention provide the ability to position the outlet housing 124 of the apparatus 36 at different locations on the channel 132. Such adjustability can be limited to two or more discreet positions or can be as many positions as desired (even an infinite range of positions).

In one embodiment, the outlet housing 124 is slidably attached to the channel 132 and can be slid to a number of different positions on the channel 132. To this end, the outlet housing 124 and channel 132 can have complimentary shapes, such as by recessing the channel 132 within a similarly shaped groove in the outlet housing 124 or by passing the channel 132 through apertures in opposite ends of the outlet housing 124. In such embodiments, the outlet housing 124 can be secured in desired positions with respect to the channel 132 in a number of different manners. For example, apertures in the outlet housing 124 and channel 132 can be aligned by the user for passing pins, threaded fasteners, or other elements therethrough. As another example, a spring-loaded pin, bearing, or other element can be biased toward the channel 132 to engage in apertures, recesses, grooves, or other mating features spaced along the channel 132. Alternatively, one or more clamps or clips connected to the outlet housing 124 can engage the channel 132 at a number of different positions. In still other embodiments, the outlet housing 124 can be moved to two or more positions along the channel 132 and can be releasably secured thereto by one or more conventional releasable fasteners such as screws, bolts, and other threaded fasteners, dowels or pins, and the like.

As a further example, the outlet housing 124 can be mounted to the channel 132 via a track and groove arrangement in which one or more resilient or spring-biased fingers or other protrusions on the outlet housing 124 extend into engagement with a plurality of grooves, apertures, detents, or other recesses in the channel 132. Specifically, the fingers or other protrusions can engage within such recesses with sufficient force to secure the outlet housing in place upon the channel 132, but can permit an assembler to force the outlet housing 124 to different positions along the channel 132 as desired.

In another embodiment, the channel 132 can be provided with a flange extending laterally away from the channel 132 and along a length thereof. The flange can be provided with a plurality of apertures into which a fastener (such as the thumbscrew 176) can extend from the outlet housing 124. The outlet housing 124 can thereby be selectively mounted at different locations along the channel 132 by sliding or otherwise moving the outlet housing 124 to a desired position along the channel 132, aligning the fastener of the outlet housing 124 with the nearest aperture in the flange, and then inserting the fastener through that aperture.

In yet another embodiment, the support frame 28 can include a backboard located between the upper and lower stretchers 56, 60 and extending some distance between the uprights 52. The backboard could have a plurality of apertures therein that are aligned in a plurality of rows such that when an apparatus 36 is selectively mounted in any one of a plurality of lateral positions along the support frame 28 as described above, one or more fasteners of the outlet housing 124 is aligned with one or more apertures in the backboard. The outlet housing 124 can therefore be selectively mounted along the channel 132 by positioning the outlet housing 124 in a desirable position along the channel 132, aligning one or more fasteners of the outlet housing 124 with one or more of the nearest apertures in the backboard, and then inserting the fasteners through the backboard apertures.

Other embodiments of the present invention can employ one or more resilient fingers attached to the outlet housing 124 and extending at least partially around the channel 132. Such fingers can engage with lips, recesses, apertures, or other features on the channel 132 so that the fingers (and connected outlet housing 124) can releasably connect to the channel 132 at different locations along the channel 132. In some embodiments, these fingers can function in a similar manner to the resilient arms or fingers of the brackets 144, 148 described above.

The embodiments described above for selectively positioning the outlet housing 124 and outlets 128 in different longitudinal positions along the channel 132 are provided by way of example only and are not intended to be limiting. Any fastener and fastening manner for selectively positioning and retaining the outlet housing 124 and outlets 128 therein in a position along the channel 132 can instead be used and fall within the spirit and scope of the present invention.

In those embodiments where the outlet housing 124 and outlets 128 can be positioned in two or more locations along the channel 132 as described above, the channel 132 is preferably shaped to permit the electric lines 136 to pass to the outlet housing 124 and outlets 128 in the different channel locations. By way of example only, the aperture 160 in the channel 132 through which the electric lines 136 pass to the outlet housing 124 and outlets 128 can be elongated in shape to permit the electric lines to exit the channel 132 at a range of locations along the channel 132.

Alternatively, the electric lines 136 can pass from the side of the channel 132 to a rear or side portion of the outlet housing 124. Other channel shapes and manners of passing the electric lines 136 from the channel 132 to the outlet housing 124 and outlets 128 are possible and would be appreciated by one having ordinary skill in the art.

The principles of the present invention can be applied to any furniture and wall system to which the channel 132 of the apparatus 36 can be connected. Most preferably, the apparatus 36 can be connected to two or more positions on the furniture and wall system and has an outlet housing 124 that can be positioned in two or more locations on the channel 132. However, either type of adjustability (described in greater detail above) can be employed without the other to practice the present invention. In the shelving unit of the illustrated preferred embodiment, the apparatus 36 is connected to a support frame 28. In other applications, the apparatus 36 can be connected to any location on a furniture or wall system. The term "support frame" as used herein therefore refers to any part of the furniture or wall system to which the apparatus 36 can be connected (adjustably as described above or otherwise).

The support frame 28 to which the apparatus 36 of the illustrated preferred embodiment is attached is substantially vertical. However, it should be noted that in other applications the apparatus 36 can be attached in any other orientation desired (i.e., horizontal applications, diagonal applications, and the like).

As described above, the apparatus 36 in some preferred embodiments can be attached to the support frame 28 in two or more horizontally-disposed locations. It should be noted that the apparatus 36 can instead be attached to the support frame 28 in two or more positions that are located in any other direction with respect to one another, such as vertically or diagonally with respect to one another. The different possible positions of the apparatus 36 on the support frame 28 is dependent at least in part upon the orientation of the support frame 28 (e.g., the orientation of stretchers 56, 60 or like elements, etc.).

The outlet housings 124 of the apparatus 36 in some preferred embodiments can be positioned in two or more longitudinal locations along the channels 132. Because the channels 132 can be attached to different support frames in any orientation (e.g., vertically, horizontally, diagonally, and the like) as just described, the outlet housings 124 can instead be positioned in two or more horizontal, diagonal, or other relative locations along the channels 132.

By way of example only, the channels 132 and stretchers 56, 60 in the illustrated preferred embodiment can be at an orientation that is 90 degrees from the orientation in FIGS. 1–3 while still functioning and providing the same benefits as described above.

Another preferred embodiment of the present invention is illustrated in FIGS. 4–7. This embodiment shares many of the same elements, structure, and features as that described above with regard to the embodiment of the present invention illustrated in FIGS. 1–3. Accordingly, elements, structure, and features of the embodiment illustrated in FIGS. 4–7 corresponding to that of the embodiment shown in FIGS. 1–3 are numbered in the 300–500 series while retaining the same last two digits. Except as expressly described in the following description, reference is hereby made to the earlier description of the embodiment shown in FIGS. 1–3 for information regarding such corresponding elements, structure, and features in the embodiment of FIGS. 4–7.

Figures 5, 6, 7:
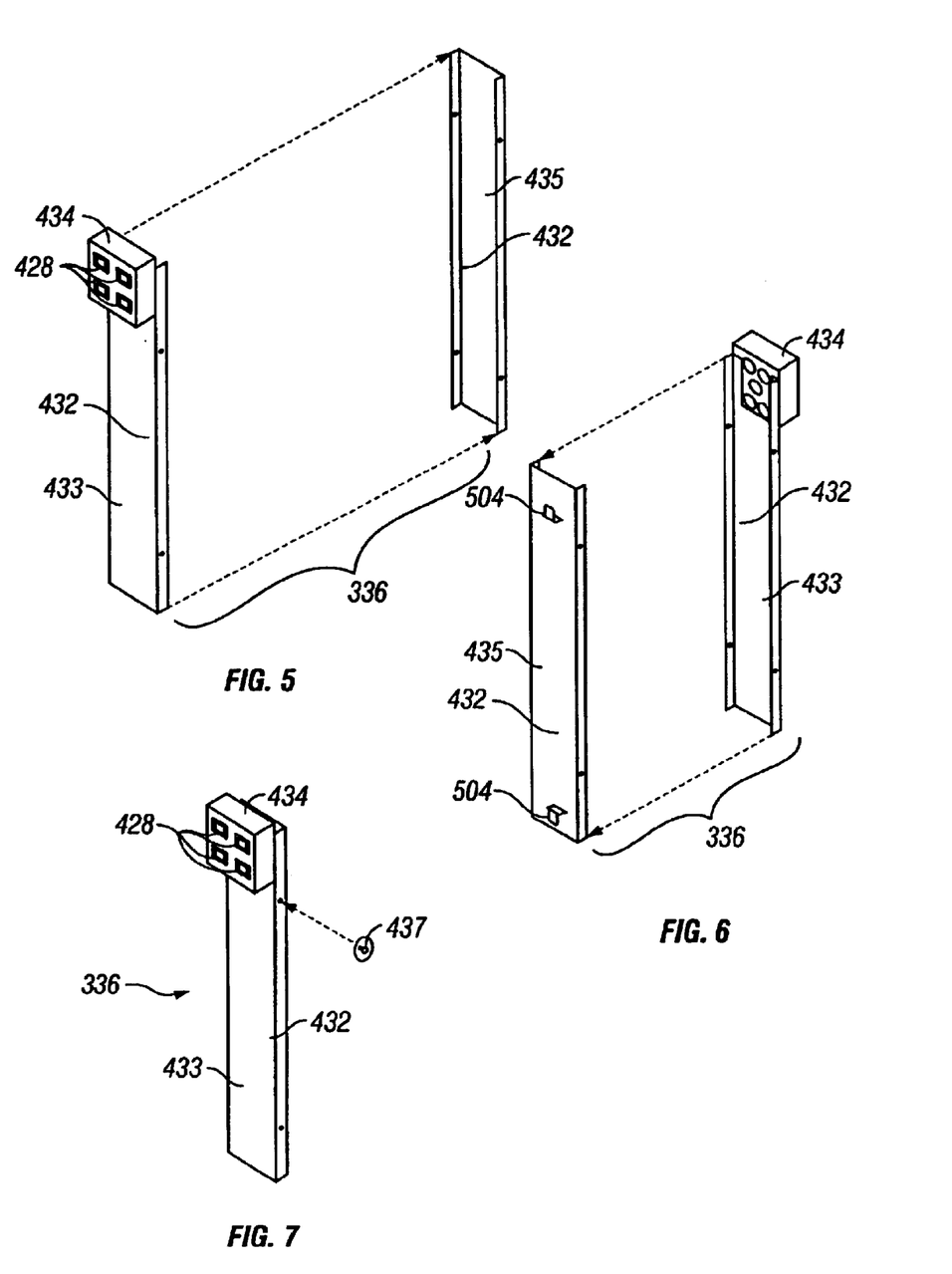
FIG. 5 is an exploded front perspective view of an apparatus illustrated in FIG. 4.
FIG. 6 is an exploded rear perspective view of an apparatus illustrated in FIG. 4.
FIG. 7 is a rear perspective view of an apparatus illustrated in FIG. 4.

The apparatus or modular conduits 336 illustrated in FIGS. 4–7 preferably have conduits or channels 432 permanently connected to outlet housings or boxes 434 by welds or in any other manner described above with reference to the embodiment illustrated in FIGS. 1–3. The channels 432 are preferably U-shaped as best shown in FIGS. 5–7, although any other channel or conduit shape having an interior sized to receive a cable as described herein can instead be used as desired.

Each channel 432 in the illustrated preferred embodiment is preferably defined by multiple elements as shown in FIGS. 5–7. More specifically, the channel 432 preferably has multiple pieces that are attached in any manner to at least partially enclose the electric line(s) 436 within the channel 432. With particular reference to FIGS. 5 and 6, the channel 432 preferably has a front portion 433 and a cover or rear portion 435 connected together by screws 437. In some highly preferred embodiments, the front and rear portions 433, 435 enclose the electric line(s) 436 along the length of the front and rear portions 433, 435. In other embodiments however, the front and rear portions 433, 435 only partially enclose the electric line(s) 436 along this length.

As mentioned above, the front and rear portions 433, 435 of the channel 432 are preferably attached in any conventional manner. For example, the front and rear portions 433, 435 can be permanently attached to each other by welds, brazing, adhesive or cohesive bonding material, bolts, screws, and other threaded fasteners, rivets, pins, posts, clips, clamps, buckles, and other conventional fasteners, front and rear portions 433, 435 can also be releasably attached to each other by inter-engaging features on the front and rear portions 433, 435 that provide a mating or snap fit for the front and cover or rear portions 433, 435, and the like. However, screws 437 are preferred in some embodiments (such as that shown in FIGS. 3–7) in order to provide a simple and inexpensive channel and apparatus design.

In the illustrated preferred embodiment, screws 437 or other fasteners are preferably passed through aligned apertures in flanges on the front and rear portions 433, 435 of the channel 432 in order to connect the front and rear portions 433, 435 together. However, one having ordinary skill in the art will appreciate that other portions of the channel 432 can be employed to attach the separate elements of the channel together, determined at least in part by the shape of the portions being connected. Apertured flanges therefore represent only one example of such connectivity.

The use of two or more elements to assemble the channel 432 provides a number of advantages, including the ability to remove one or more elements to gain access to the interior of the channel 432 and electric lines 436 therein, increased convenience in running the electric lines 436, and more options for easy installation of the apparatus 336. Most preferably, the front and rear portions 433, 435 are disconnectable from one another in order to provide such advantages. Accordingly, the front and rear portions 433, 435 are preferably connected together using releasable fasteners or fastening elements.

By employing a channel or conduit 432 constructed of multiple elements as described above, an installer has more options regarding the manner in which the apparatus 336 is installed. By way of example only, the installer can assemble the apparatus 336 with electric line(s) 436 therein and can then install the assembled apparatus 336 on the support frame 328, or the installer can install the cover or rear portion 435 of the apparatus 336 on the support frame 328, route electric lines 336 therethrough, and then cover the electric lines 336 with the front portion 433.

Removable front and rear portions 433, 435 provide the ability to access the interior of the channel 432 and electric lines 436 therein without requiring the complete removal or disassembly of the apparatus 336 from the support frame 328. In many cases, an apparatus 336 cannot be removed without removing or at least partially disassembling other elements of the support frame 328 and/or elements and structure connected thereto. For example, one or more wall panels connected to the support frame 328 can block removal of the apparatus 336. Without the ability to access the interior of the channel 432 in such cases, the apparatus 336 might otherwise need to be removed for various reasons, such as to change or service electrical outlets 428 or wiring connections within the apparatus 336, to remove wiring in the apparatus 336, or to run new wiring in the apparatus 336.

Although two-piece channels and channels having one or more removable portions provide a number of advantages to users and installers, it will be appreciated that channels 432 defined by other numbers of pieces (e.g., three and four-piece channels 432) can provide similar advantages. For example, the channel 432 can have three sections, two of which are removable to gain access to different sides or different lengths of the channel 432. As another example, a channel 432 can be constructed of several housing elements, any one or more of which can be removed for access to any portion of the channel 432 desired.

As described above, the channels 432 in the illustrated preferred embodiments have front and rear portions 433, 435 that are preferably releasably connected together. In other embodiments, any of the channels 432 can be constructed of different types and combinations of elements which can easily be removed to gain access to the interior of channel 432 or otherwise achieve the same advantages as described above with respect to the embodiment illustrated in FIGS. 4–7. For example, the channels 432 can be defined by side-by-side channel halves connected together, two or more channel lengths connected in an end-to-end fashion, upper and/or lower removable channel portions, and the like.

The channels 432 in the illustrated preferred embodiment each preferably have a front portion 433 removably connected to a rear portion 435 for purposes described earlier. It should be noted that at least some of the advantages offered by a removable channel portion as described above are also available for channel portions that are not removable. For example, the front portion 433 of the channel 432 can be pivotably connected to the rear portion 435 to enable a user to open the channel 432 and to access the interior of the channel 432. As another example, the front portion 433 can be slidably connected to the rear portion 435 for the same purpose of gaining access to the channel's interior. Still other manners of opening and closing these and different portions of the channel 432 are possible, and depend at least partially upon the shape of the channel 432, its component parts, and the orientation and arrangement of the channel components with respect to one another. Such other manners of opening and closing the channel 432 by moving one or more of its component parts to readily access the channel's interior fall within the spirit and scope of the present invention.

Figure 8:
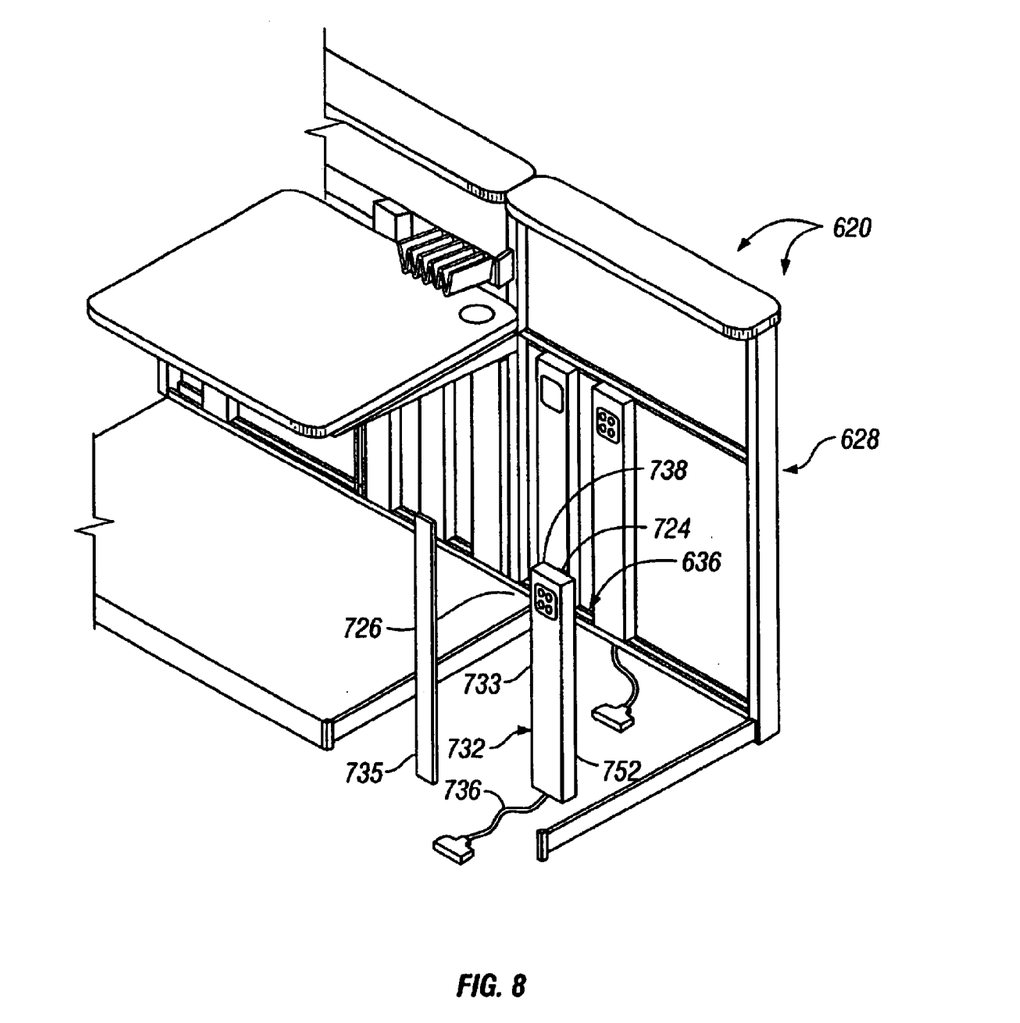
FIG. 8 is a perspective view of a partially assembled modular construction system and apparatus or modular conduit according to a preferred embodiment of the present invention.

Yet another preferred embodiment of the present invention is illustrated in FIG. 8. This embodiment shares many of the same elements, structure, and features as that described above with regard to the embodiment of the present invention illustrated in FIGS. 4–7. Accordingly, elements, structure and features of the embodiment illustrated in FIG. 8 corresponding to that of the embodiment shown in FIGS. 4–7 are numbered in the 600–800 series while retaining the same last two digits. Except as expressly described in the following description, reference is hereby made to the earlier description of the embodiment shown in FIGS. 4–7 for information regarding such corresponding elements, structure, and features in the embodiment of FIG. 8.

Like the embodiment of the present invention illustrated in FIGS. 4–7, the embodiment of FIG. 8 has a multiple-piece rail providing the same or similar advantages and features described above. The rear portion 735 of each rail 732 is preferably similar to the rail 132 in the preferred embodiment illustrated in FIGS. 1–3, and can be connected to the support frame 628 of the modular shelving unit 620 in any of the manners described above with respect to the embodiment of FIGS. 1–3. Also, the outlet housing 724 of the outlet assembly 636 is preferably at least partially received within the front portion 733 of the rail 732. For example, the outlet housing 724 in the illustrated preferred embodiment of FIG. 8 is located between the flanges in the front portion 733 of the rail 732. Although this relationship between the rail 732 and the outlet housing 724 can result in wider tail designs in some cases, an outlet housing 724 located or otherwise at least partially received within the rail 732 can provide a more direct path for electric lines 736 to and into the outlet housing 724 from the rail 732. For example, the electric lines 736 can pass into a side of the outlet housing 724 rather than into a rear of the outlet housing 724 (as is the case in the illustrated preferred embodiment of FIGS. 1–3). Also, an outlet housing 724 at least partially received within the rail 732 can provide a more desirable appearance for the outlet assembly 636. In those embodiments of the present invention in which the outlet housing 724 is at least partially received within the rail 732, the rail 732 can have one or more apertures or recesses 752 providing access to the electrical outlets 728.

The embodiments described above and illustrated in the figures are presented by way of example only and not intended as a limitation upon the concepts and principles of the present invention. As such, it will be appreciated by one having ordinary skill in the art that various changes in the elements and their configuration and arrangement are possible without departing from the spirit and scope of the present invention.

For example, the outlet assembly 36, 436 of the present invention is described above for use with electrical and telecommunications lines. In this regard, some embodiments of the present invention permit the outlet assembly 36, 436 to be quickly disconnected from the support frame 28, 328 as desired. This enables the installer or user to easily position the outlets 128, 428 in different desired locations on the support frame 28, 328, and with respect to the modular shelving unit 20, or other furniture, wall, or partition system of which the support fame 28, 328 is a part. Although the present invention is described above for use with electrical and telecommunications lines, the present invention can be employed with other types of lines and outlets to provide the same or similar advantages. By way of example only, the outlet assembly 36, 436 of the present invention can be employed to receive and/or position pneumatic or hydraulic pipes, conduits, tubes or any other type of line carrying any type or mixture of gas and fluid. In such cases, the outlets 128, 428 can take a number of different forms, such as quick disconnect fittings, threaded connectors, nipples, press fittings, and any other fluid or gas line connector or fitting desired. Still other applications of the outlet assembly 36, 436 of the present invention are possible to provide the same or similar advantages as described above.

What is claimed is:

1. An apparatus for cooperating with a modular construction system forming a plurality of different predetermined mounting positions to repositionably support an electrical line suitable for transmitting at least one of telecommunications data and electrical power, the apparatus comprising:

an elongated channel sized for receiving the electrical line;

an outlet box mounted on the channel, the interior of the outlet box communicating with the interior of the channel, the electrical line extending into the interior of the outlet box;

an electrical outlet mounted to the outlet box, the electrical line connected to the electrical outlet via an electrical connection located within the interior of the outlet box; and means for removably attaching the apparatus to the modular construction system in the plurality of different predetermined mounting positions to repositionably support the electrical line, the apparatus removably attachable to the modular construction system in the different predetermined mounting positions independent of any other fixture, wherein the plurality of different predetermined mounting positions includes a plurality of different vertical and lateral mounting positions on the modular construction system.

2. The apparatus of claim 1 wherein one of the plurality of mounting positions is laterally displaced with respect to another of the plurality of mounting positions.

3. The apparatus of claim 1 wherein one of the plurality of mounting positions is inverted with respect to another of the plurality of mounting positions.

4. The apparatus of claim 1 in which the modular construction system also includes a base; and a support frame that forms the plurality of mounting positions and is connected to the base.

5. The apparatus of claim 4 in which the electrical line has two ends, one of the ends being in electrical contact with the electrical outlet, and the electrical line extends from the electrical outlet to at least the base.

6. The apparatus of claim 1 in which the electrical line is retained substantially within the interior of the channel by a removable cover.

7. The apparatus of claim 1 in which the modular construction also includes a base; and a support frame that forms a the plurality of mounting positions and is connected to the base, the support frame including a plurality of elongated, vertically oriented uprights and elongated, horizontally oriented upper and lower stretchers, at least two of the stretchers cooperating to form the plurality of mounting positions.

8. The apparatus of claim 7 which is removably attachable to the uprights in essentially the same plane as the stretchers or removably attachable to the stretchers in essentially the same plane as the uprights, so that modular shelves or other elements of the modular construction system are mountable on the support frame without being obstructed by the apparatus.

9. The apparatus of claim 1 in which the electrical outlet is substantially within the interior of the outlet box.

10. The apparatus of claim 1 in which the outlet box is substantially outside the interior of the channel.

11. The apparatus of claim 1 in which the outlet box is repositionably mounted on the channel.

12. The apparatus of claim 4 in which the means for removably attaching the apparatus to the modular construction system includes a thumbscrew for fixing the apparatus to the support frame.

13. A modular conduit for use with a modular construction system forming a plurality of different predetermined mounting locations to repositionably support an electrical line suitable for transmitting at least one of telecommunications data and electrical power, the modular conduit comprising:

an elongated channel that has an open portion for providing access to the interior of the channel, and is sized for receiving the electrical line;

a cover that fits over at least a part of the open portion for restricting access to the interior of the channel;

an outlet box mounted on the channel, the interior of the outlet box communicating with the interior of the channel, the electrical line extending into the interior of the outlet box;

an electrical outlet mounted to the outlet box, the electrical line connected to the electrical outlet via an electrical connection located within the interior of the outlet box; and means for removably attaching the modular conduit in the plurality of different predetermined mounting locations so that the modular conduit and the modular construction system cooperatively and repositionably support the electrical line, wherein the modular conduit is removably attachable to the modular construction system in the plurality of different predetermined mounting locations independent of any other fixture, the plurality of different predetermined mounting locations including a plurality of different vertical and lateral mounting locations on the modular construction system.

14. The modular conduit of claim 13 which also includes a clip for retaining the electrical line substantially within the channel.

15. The modular conduit of claim 13 in which the modular construction system also includes
   a base; and
   a support frame which forms a the plurality of mounting positions and is connected to the base.

16. The modular conduit of claim 13 in which the modular construction system also includes
   a base; and
   a support frame that forms a the plurality of mounting positions and is connected to the base, the support frame including a plurality of elongated, vertically oriented uprights and elongated, horizontally oriented upper and lower stretchers, at least two of the stretchers cooperating to form a the plurality of mounting positions.

17. The apparatus of claim 13 in which the electrical outlet is substantially within the interior of the outlet box.

18. The apparatus of claim 13 in which the outlet box is substantially outside the interior of the channel.

19. The apparatus of claim 13 in which the cover is removable.

20. The apparatus of claim 13 in which the cover is pivotably attached.

21. A work station including a repositionable power outlet and/or data connection port, which work station comprises:
   a base;
   a support frame that forms a plurality of different predetermined mounting positions and is connected to the base; and
   a modular conduit repositionably attachable to the support frame in the plurality of different predetermined mounting positions independent of any other fixture, the modular conduit vertically and horizontally repositionable to the different predetermined mounting positions on the support frame and including a channel sized to receive an electrical line suitable for transmitting at least one of telecommunications data and electrical power, an outlet box mounted on the channel with the electrical line extending into an interior of the outlet box, and an electrical outlet mounted to the outlet box, the electrical line connected to the electrical outlet via an electrical connection located at least partially within the interior of the outlet box.

22. The work station of claim 21 which also includes a cover for restricting access to an interior of the channel.

23. The work station of claim 21 which also includes a clip for retaining the electrical line substantially within an interior of the channel.

24. The work station of claim 21 in which the base includes a base plate attached to the support frame.

25. The work station of claim 21 which also includes a filler panel attached to the support frame.

26. The work station of claim 21 which also includes at least one shelf connected to the support frame.

27. A method for repositionably supporting an electrical line in a modular construction system forming a plurality of different predetermined vertical and horizontal mounting locations, the method comprising:
   providing a modular construction system forming the plurality of different predetermined vertical and horizontal mounting locations;
   selecting a mounting location from the plurality of different predetermined vertical and horizontal mounting locations;
   removably attaching an elongated channel to the modular construction system at the selected mounting location independent of any other fixture, the channel having a substantially open side for providing access to an interior of the channel and an outlet box mounted on the channel, the interior of the outlet box communicating with the interior of the channel;
   positioning within the interior of the channel the electrical line suitable for transmitting at least one of telecommunication data and electrical power; and
   installing an electrical outlet in the outlet box, the electrical outlet electrically connected to the electrical line via an electrical connection located at least partially within the interior of the outlet box.

28. An outlet positioning apparatus for use with an electrical line suitable for transmitting at least one of telecommunications data and electrical power, the outlet positioning apparatus adapted for releasably mounting to a modular construction system the outlet positioning apparatus comprising:
   a conduit defining an internal cavity;
   at least one fastener shaped to releasably mount the apparatus to the modular construction system in any of a plurality of different predetermined horizontal and vertical positions on the modular construction system independent of any other fixture, the conduit having a location adjustable with respect to the modular construction system via the plurality of different predetermined horizontal and vertical positions on the modular construction system;
   an outlet box mounted to the conduit; and
   an electrical outlet mounted to the outlet box;
   wherein the outlet box is positioned with respect to the conduit to enclose at least one connection between the electrical line and the electrical outlet within the interior of the outlet box.

29. The apparatus of claim 28, wherein the outlet box is mounted to the conduit at an end of the conduit.

30. The apparatus of claim 28, wherein the electrical outlet is mounted within the interior of the outlet box.

31. The apparatus of claim 28, wherein the electrical outlet is one of a plurality of electrical outlets mounted to the outlet box.

32. The apparatus of claim 31, wherein the plurality of electrical outlets is mounted within the interior outlet box.

33. The apparatus of claim 28, wherein the conduit has a generally U-shaped cross-section defining the internal cavity.

34. The apparatus of claim 28, wherein the conduit includes first and second portions releasably connected to one another to form the internal cavity.

35. The apparatus of claim 34, wherein the first and second portions each have a generally U-shaped cross-section.

36. The apparatus of claim 34, wherein the outlet box is mounted to one of the first and second portions.

37. An apparatus for cooperating with a modular construction system forming a plurality of different predetermined mounting positions on the modular construction system to repositionably support shelves and at least one electrical line suitable for transmitting at least one of telecommunications data and electrical power, the apparatus comprising:

an elongated channel sized for receiving the electrical line in an interior of the elongated channel;

an outlet box mounted on the elongated channel and adapted to receive the electrical line extending through at least a portion of the elongated channel;

wherein the elongated channel and the shelves are adapted to be removably mounted to the modular construction system in the plurality of different predetermined mounting positions on the modular construction system independently with respect to one another, the plurality of different predetermined mounting positions enabling the elongated channel to be mounted in different positions on the modular construction system independent of any other fixture, the elongated channel mountable on the modular construction system in both horizontal and vertical mounting orientations.

38. The apparatus of claim 37 in which the electrical line is retained substantially within the interior of the channel by a removable cover.

39. The apparatus of claim 37 in which the outlet box is substantially within the interior of the channel.

40. The apparatus of claim 37 in which the outlet box is substantially outside the interior of the channel.

41. The apparatus of claim 37 in which the outlet box is repositionably mounted on the channel.

* * * * *